No. 738,925. PATENTED SEPT. 15, 1903.
R. A. MOORE.
FERTILIZER MIXER.
APPLICATION FILED JUNE 29, 1903.
NO MODEL. 2 SHEETS—SHEET 2.
Fig. 4
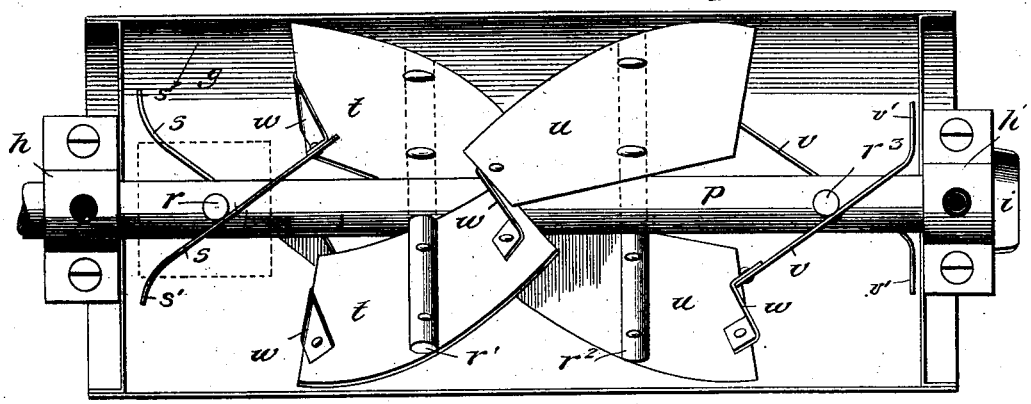
Fig. 5
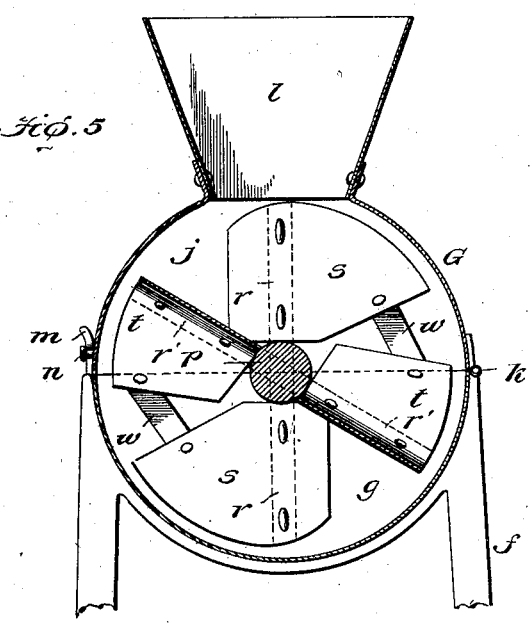
Fig. 6
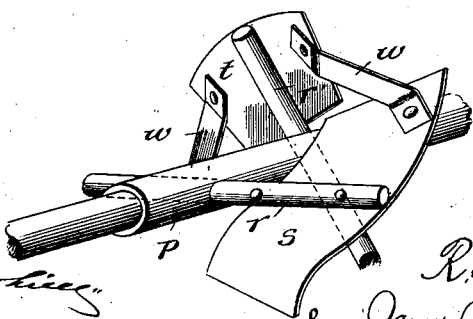
Witnesses
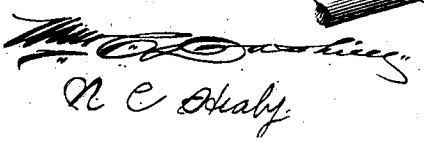
Inventor
R. A. Moore
by James Sheehy
Attorney
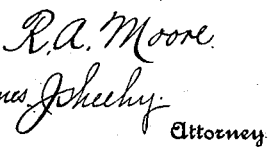
THE NORRIS PETERS CO., PHOTO-LITHO., WASHINGTON, D. C.

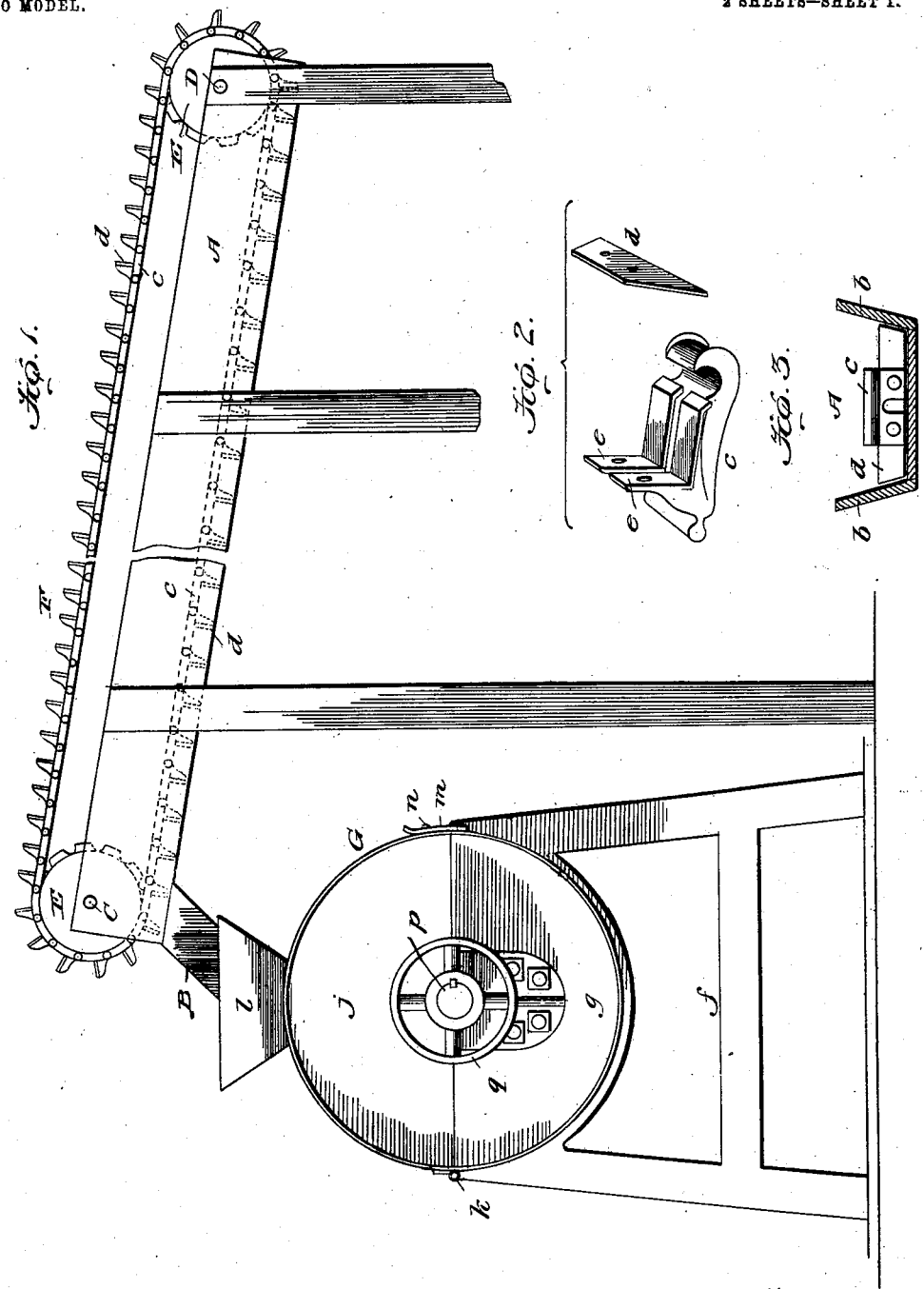

No. 738,925. Patented September 15, 1903.

UNITED STATES PATENT OFFICE.

RALSTON A. MOORE, OF TENNILLE, GEORGIA.

FERTILIZER-MIXER.

SPECIFICATION forming part of Letters Patent No. 738,925, dated September 15, 1903.

Application filed June 29, 1903. Serial No. 163,652. (No model.)

*To all whom it may concern:*

Be it known that I, RALSTON A. MOORE, a citizen of the United States, residing at Tennille, in the county of Washington and State of Georgia, have invented new and useful Improvements in Fertilizer-Mixers, of which the following is a specification.

My invention pertains to fertilizer apparatus, and has for its object to provide a simple, strong, and durable apparatus calculated to expeditiously and thoroughly mix guano and the like.

The invention will be fully understood from the following description and claims, when taken in connection with the accompanying drawings, in which—

Figure 1 is a view illustrating the relative arrangement of the mixer and feeding means of the apparatus, the mixer being shown in end elevation and the feeding means in side elevation and as partly broken away. Fig. 2 comprises enlarged disconnected perspective views of one link and one blade of the endless conveyer forming part of the feeding means. Fig. 3 is a transverse section taken through the trough and the conveyer of the feeding means. Fig. 4 is a plan view of the mixer with the upper section of its cylindrical casing removed. Fig. 5 is a transverse section of the mixer, and Fig. 6 is a detail perspective view illustrating the manner in which the blades of the mixer are connected to the shaft thereof and together.

Similar letters designate corresponding parts in the several views of the drawings, referring to which—

A is a suitably-supported inclined trough which extends upwardly from a point adjacent to the ground and has a bottom wall $a$ and outwardly-inclined side walls $b$, Fig. 3. B is a chute depending from the upper end of said trough, C D transverse shafts journaled in suitable bearings in the side walls of the trough adjacent to the upper and lower ends thereof and bearing sprocket-wheels E, and F an endless conveyer arranged on the wheels E and in the trough A and made up of links $c$ and blades $d$, attached to arms $e$ on the links. These parts constitute the feeding means of my improved apparatus, the conveyer F being adapted, when material is supplied to the lower end of the trough A and one of the shafts is driven, to carry the material up to and discharge it on the chute B.

G is the mixer, which is arranged to receive material from the chute B, as shown in Fig. 1. The said mixer in the preferred embodiment of my invention comprises cast-iron or other suitable supports $f$, a lower casing-section $g$, arranged on and bolted to the supports and having journal-boxes $h\ h'$ at its opposite ends, and a discharge-chute $i$ at one end below the adjacent journal-box $h'$, an upper casing-section $j$, hinged at $k$ to the lower section and having a hopper $l$ disposed below the chute B, Fig. 1, fasteners $m$, pivoted to the lower-casing section $g$ and arranged to engage studs $n$ on the upper casing-section $j$, so as to normally retain said section $j$ in a closed position, a longitudinal central shaft $p$, journaled in the boxes $h\ h'$ of the casing and having a band-pulley $q$ at one end outside the casing adapted to receive a belt from a suitable motor, four (more or less) rods $r\ r'\ r^2\ r^3$, extending diametrically through the shaft $p$ at intervals in the length thereof and beyond opposite sides of the shaft, as best shown in Fig. 6, blades $s$, $t$, $u$, and $v$, riveted to the extended portions of the rods $r$, $r'$, $r^2$, and $r^3$, respectively, and bearing at their inner edges against the shaft, so as to hold the rods against endwise movement through the shaft, and straps or bars $w$, interposed between and rigidly connecting the adjacent ends of the blades $s$ and $t$, the adjacent ends of the blades $t$ and $u$, and the adjacent ends of the blades $u$ and $v$. In virtue of the several blades being connected together and to the shaft in the manner just described the blades are braced by each other and the shaft, and hence liability of the blades being bent or broken incident to the use of the mixer is reduced to a minimum.

As best shown in Fig. 4, the blades $s$ are disposed opposite to each other and at acute angles to the axis of the shaft $p$, as are also the blades $t$, the blades $u$, and the blades $v$; also, the blades $s$ have outwardly-extending angular branches $s'$ at their rear ends, and the blades $v$ have outwardly-extending angular branches $v'$ at their forward ends. In virtue of the several blades being disposed at acute angles to the axis of the shaft $p$ it will be observed that each blade takes up and agitates the ingredients that enter into guano as the same are fed into the casing of mixer through the hopper thereof, with the result that the thorough mixture of the guano is accelerated; also, that the blades serve to quickly convey the guano through the mixer, which contributes materially to the capacity of the apparatus. It will further be observed that the peculiarly-disposed blades are advantageous, because they cut into rather than strike flatwise against the mass of guano in the casing, and hence but little power is required to drive the shaft $p$.

The outwardly-extending angular branches at the rear ends of the blades $s$ and the forward ends of the blades $v$ are advantageous, since they cut into and mix the guano adjacent to the ends of the cylindrical casing and prevent massing of the guano at such ends.

In the practical operation of the apparatus the conveyer F and the shaft $p$ are driven by means not shown, and the ingredients that enter into guano are fed to the lower end of the trough A. When this is done, the conveyer will carry the ingredients to and discharge them on the chute B, which in turn will discharge the ingredients to the casing of the mixer through the hopper $l$ thereof. The guano will be expeditiously and thoroughly mixed in the mixer and as expeditiously discharged therefrom through the chute $i$ into bags or other receptacles placed to receive it. When the mixer becomes choked from any cause, the upper casing-section may be readily opened to facilitate the removal of the obstruction.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my invention as claimed.

Having described my invention, what I claim, and desire to secure by Letters Patent, is—

1. A guano-mixer comprising a horizontal, cylindrical casing having an inlet adjacent to one end and a discharge-opening at its opposite end, a longitudinal shaft journaled in suitable bearings in the casing, end blades carried by said shaft, and disposed opposite to each other and at acute angles to the axis of the shaft, and having outwardly-extending branches at their ends adjacent to the ends of the casing, and intermediate blades also carried by the shaft, and disposed opposite to each other and at acute angles to the axis of the shaft.

2. In a guano-mixer, the combination of a casing, a shaft journaled in suitable bearings in the casing, and having diametrical openings at intervals of its length, rods extending through said openings of the shaft and beyond opposite sides thereof, blades fixedly connected to the extended portions of the rods, and bearing, at their inner edges, against the shaft, and means rigidly connecting the adjacent ends of the blades.

3. In a guano-mixer, the combination with a horizontal, cylindrical casing comprising a lower section having a discharge-chute at one end, an upper section, hinged, at one side, to the lower section, and having a hopper at a point adjacent to the opposite end of the casing, with reference to the discharge-chute, and means for fastening the upper section in its closed position; of a longitudinal shaft journaled in suitable bearings on ends of the lower casing-section, end blades carried by said shaft, and disposed opposite to each other and at acute angles to the axis of the shaft, and having outwardly-extending branches at their ends adjacent to the ends of the casing, and intermediate blades also carried by the shaft, and disposed opposite to each other and at acute angles to the axis of the shaft.

4. In a guano-mixer, the combination with a horizontal, cylindrical casing comprising a lower section having a discharge-chute at one end, an upper section, hinged, at one side, to the lower section, and having a hopper at a point adjacent to the opposite end of the casing, with reference to the discharge-chute, and means for fastening the upper section in its closed position; of a shaft journaled in suitable bearings on the ends of the lower casing-section, and having diametrical openings at intervals of its length, rods extending through said openings of the shaft, and beyond opposite sides thereof, and end and intermediate blades fixedly connected to the extended portions of the rods, and together, and bearing at their inner edges against the shaft; the end blades being disposed opposite to each other and at acute angles to the shaft, and having outwardly-extending branches at their outer ends, and the intermediate blades being also disposed opposite to each other and at acute angles to the shaft.

In testimony whereof I have hereunto set my hand in presence of two subscribing witnesses.

RALSTON A. MOORE.

Witnesses:
CLEMENT E. BROWN,
HERBERT M. TUYLIM.